United States Patent [19]

Hoseley

[11] Patent Number: 4,630,712

[45] Date of Patent: Dec. 23, 1986

[54] AUTOMATIC CHAIN LUBRICATING SYSTEM

[75] Inventor: Rex A. Hoseley, Wheaton, Md.

[73] Assignee: United States Postal Service, Washington, D.C.

[21] Appl. No.: 295,360

[22] Filed: Aug. 24, 1981

[51] Int. Cl.$^4$ .......................... F16N 7/00; F16N 29/00
[52] U.S. Cl. ........................................ 184/15.3; 184/6
[58] Field of Search .................. 184/15.1, 15.3, 6.26, 184/15.2, 6; 200/61.89, 61.18

[56] References Cited

U.S. PATENT DOCUMENTS

| | | | |
|---|---|---|---|
| 3,031,033 | 4/1962 | Burrows | 184/15.1 |
| 3,067,837 | 12/1962 | Burrows | 184/15.1 |
| 3,116,810 | 1/1964 | Olson | 184/15.1 |
| 3,450,227 | 6/1969 | Montgomery | 184/6 |
| 3,684,059 | 8/1972 | Stoner | 184/15.3 |
| 3,785,456 | 1/1974 | McIntire et al. | 184/15.1 X |
| 4,024,930 | 5/1977 | Thomson et al. | 184/15.3 |
| 4,062,421 | 12/1977 | Weber | 200/61.89 X |
| 4,064,970 | 12/1977 | Reeves | 184/15.3 |
| 4,109,758 | 8/1978 | Kolmonen et al. | 184/15.2 |
| 4,205,708 | 6/1980 | Burgbacher | 184/6.26 X |
| 4,212,372 | 7/1980 | Murphy et al. | 184/15.3 |
| 4,271,763 | 6/1981 | Berger | 200/61.18 |
| 4,274,509 | 6/1981 | Thomson et al. | 184/15.3 |
| 4,368,803 | 1/1983 | Dombroski et al. | 184/15.3 |

Primary Examiner—David H. Brown
Attorney, Agent, or Firm—Theodore Major

[57] ABSTRACT

A lubricating system which uses a chain sprocket to determine the precise chain pin location and deliver the lubricant to preselected points along an endless moving chain is disclosed. In accordance with the invention, steel bars or plates are mounted on alternate sprockets or gear teeth such that as the sprocket rotates the steel bars pass in proximity to a magnetic sensing means which creates a signal to energize fastacting solenoid valves so as to cause the lubricant to be delivered through lubricant nozzles positioned in alignment with the links of the chain.

1 Claim, 2 Drawing Figures

AUTOMATIC CHAIN LUBRICATING SYSTEM

BACKGROUND OF THE INVENTION

1. Field of the Invention

The present invention relates to a chain lubricating system and, more particularly, to a novel lubricating apparatus for automatically controlling the flow of a given quantity of a lubricant to a preselected area or point on the chain.

2. Brief Description of the Prior Art

As known in the art, industrial type chains, which are employed, for example, in conveyors used for transporting various materials, must be kept well lubricated to prevent binding, excessive wear, and the like. In general, known chain lubricating systems include a source of lubricant and one or more discharge tubes communicating with the lubricant source and having outlets or discharge nozzles directed toward the chain. Means are also typically provided for effecting an intermediate discharge of the lubricant from the lubricant source onto the chain.

In this regard, in recent years much time and research efforts have been expended in an attempt to develop automatic lubricating systems which distribute a lubricant through one or more nozzles to certain preselected points on the chain while the chain is in motion. To a large extent, lubricating apparatus of this type involve the use of a cam action to activate a valve which disperses the lubricant or oil directly onto the chain. Such cam action systems generally comprise a lever or a roller which is displaced by contact with a chain pin or the like, this displacement serving to open a valve causing oil to flow through the lubricant nozzle. Specific examples of such apparatus are disclosed in U.S. Pat. Nos. 3,116,810; 3,171,510; 3,031,033 and 3,785,456. In further designs or proposals, mechanical switches, activated by various means, are employed to open a valve to cause a discharge of a lubricant onto the given chain surface. Thus, in U.S. Pat. No. 3,067,837, a microswitch is contacted by the outer arms of a rotating starwheel to cause periodic opening of a solenoid valve. The arms of the starwheel engage, or mesh with the chain links. In U.S. Pat. No. 3,031,033, a pivotally mounted arm is used in lieu of the starwheel to activate a microswitch.

While many such lubricating systems have been proposed and have achieved, to some extent, commercial acceptance, in general known lubricating apparatus suffer from certain distinct disadvantages. These include overlubrication, lubrication to surfaces that do not require lubrication, misalignment of the lubricant nozzle so that the lubricant misses the chain, damage to synthetic components of the chain by contact with the lubricant and the like. Moreover, and a specific problem to which the present invention is directed, known lubricating systems such as the aforenoted cam acting apparatus, are not adapted and are generally ineffective for modern high speed chain driven apparatus. The present invention is directed to an advance and improvement over prior lubricating apparatus and is uniquely adapted for use in high speed systems.

SUMMARY OF THE INVENTION

In summary, the present invention is directed to a new and improved chain lubricating system wherein a given quantity of lubricant is distributed to certain precise and preselected locations or points along a moving chain. In its broadest aspect, the unique lubricating system of the invention is based on, and embodies the concept of, the use of the chain sprocket or gear to determine the chain pin location to deliver lubricant to the preselected and proper areas or points along the moving endless chain. In this manner, over-lubrication or lubrication to areas that do not require lubrication is significantly reduced. The apparatus of the invention, and again broadly speaking for the moment, comprises a source of lubricant; lubricant transfer means in operative association with the source of lubricant and which include one or more fast-acting solenoid valves, each of said valves being in operable communication with a lubricant nozzle positioned in alignment with the links of the chain, and, magnetic sensing means for generating a signal which causes the solenoid valves to deliver lubricant through the nozzles to precise points of the chain. As to be discussed in more detail hereinafter, ferro-magnetic means, such as steel bars or plates are mounted on alternate sprockets or gear teeth, and in close contact with the electromagnetic sensing means. As the sprocket rotates, the steel bars or plates pass in proximate contact with the magnetic sensor creating a signal which closes a proximity switch to energize the solenoid valves and to deliver the lubricant through each of the nozzles and onto the chain. In a preferred embodiment of the invention, pressurized air issuing from a separate set of nozzles, forces the lubricant into the chain interfaces and removes excess lubricant.

It is accordingly a general object of the present invention to provide a new and improved chain lubricating system.

A further and more particular object is to provide an automatic chain lubricating system which is adapted to distribute a given quantity of a lubricant through stationary nozzles to preselected points on the chain while the chain is in motion.

Yet still another object is to provide a lubricating system that is not subject to disadvantages of known lubricating apparatus and which is particularly adapted for use for lubricating chains utilized in high speed systems or apparatus.

BRIEF DESCRIPTION OF THE DRAWING

The manner in which the foregoing and further objects are achieved in accordance with the present invention will be better understood in view of the following detailed description and accompanying drawing, which forms a part of the specification and wherein.

DESCRIPTION OF PREFERRED EMBODIMENTS

Figure 1:
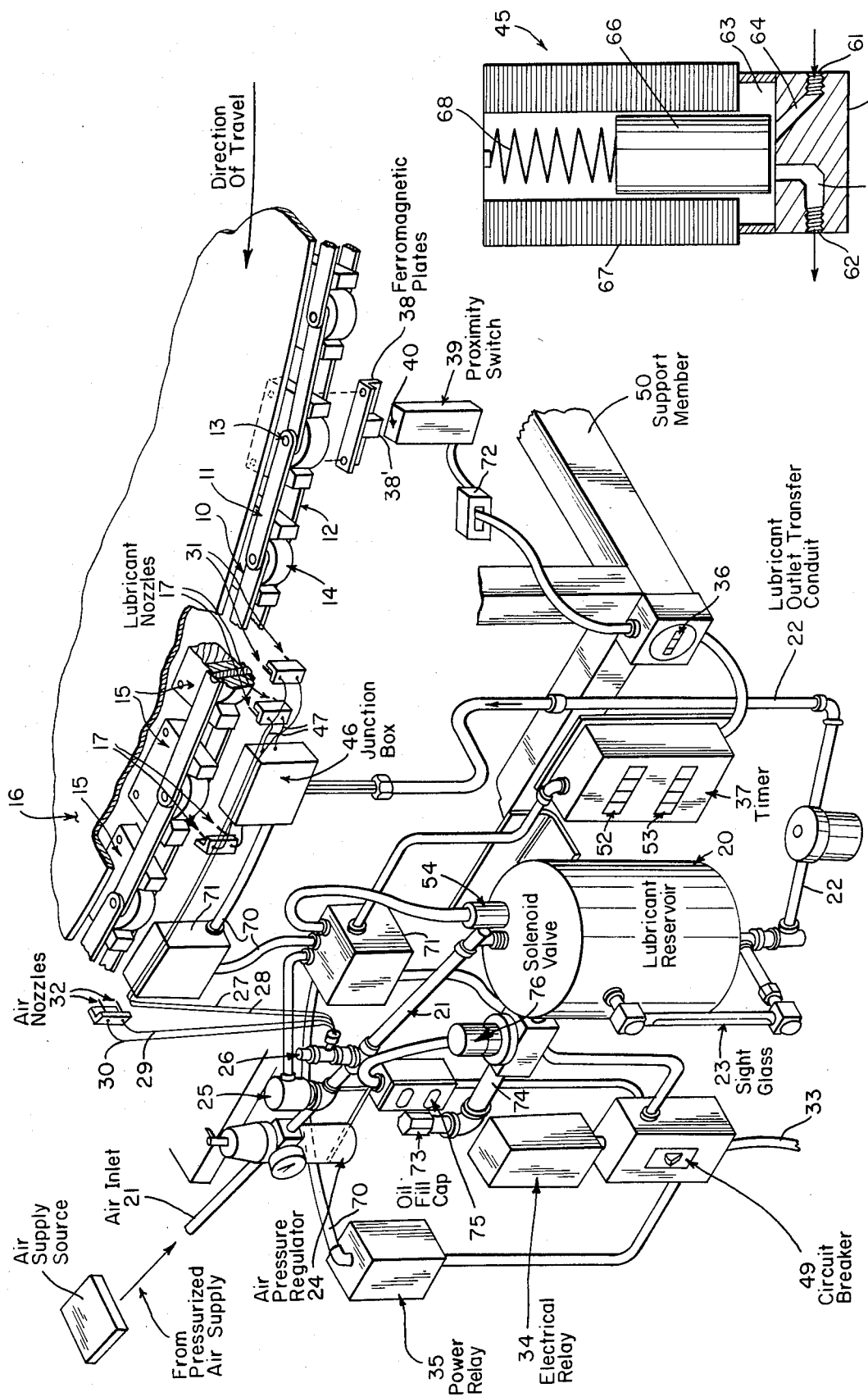
FIG. 1 is a front perspective view of a chain lubricating apparatus that may be employed in accordance with the present invention.

As briefly discussed above, the present invention is directed to an improved lubricating apparatus which is designed for delivering a lubricant to precise locations along a moving chain and which is uniquely adapted for modern high speed chain-driven apparatus, such as parcel (mail) sorting machines or conveying apparatus. The apparatus of the invention comprises a lubricant reservoir or storage vessel; lubricant transfer means including one or more lubricant nozzles positioned adjacent to the chain and directed toward the links thereof, and electromagnetic sensing means for generating a signal in response to proximate contact with ferro magnetic means, such as a steel plate or stud, positioned at fixed points along the chain sprocket or gear in which the chain is caused to rotate. As to be described in more detail hereinafter, the signal produced by the sensing means causes solenoid lubricant valves associated with the lubricant transfer means and each of the aforesaid lubricant nozzles to open and to deliver a given quantity of lubricant onto the chain at points defined by the preset position of the ferro magnetic means relative to the chain.

In this regard and turning now to more specific details of the invention, the accompanying drawings illustrate a particularly advantageous apparatus embodiment wherein the lubricating device of the invention is employed to lubricate an endless chain 10 having parallel links 11 and 12, interconnecting cross pins 13 and rollers 14. In the embodiment shown in the drawing, the rollers 14 ride within generally U-shaped gear teeth 15 of the drive sprocket 16, this structure being known in the art. The gear teeth 15 are spaced to match the design pitch of the chain so that regardless of the wear or stretch of the chain, the chain is held to the design pitch while on the sprocket or within the gear teeth. The position of the chain while on the sprocket or gear, though under tension, will have tolerances that allow the lubricant to penetrate the chain wear points. Lubricant nozzles, indicated at 17, are positioned to apply lubricant directly to the chain pins at the interfaces at both ends of the chain length at the same moment.

With reference to FIG. 1, the lubricating apparatus includes a lubricant reservoir or storage tank 20 having an inlet air supply conduit 21 and a lubricant outlet transfer conduit 22. As shown, the lubricant reservoir may include suitable means, such as a sight glass 23, for indicating the level of the lubricant in the vessel. Air is supplied under pressure to the lubricant reservoir 20 from any convenient pressurized air supply source (not shown) through the air supply conduit 21 which, in the embodiment illustrated in the drawing, includes a filter-/air pressure regulator 24, a solenoid air control valve 25 and a small manifold type T-fitting 26 leading to four air lines 27, 28, 29 and 30 which supply pressurized air to air nozzles 31 and 32 positioned on opposite sides or ends of the lubricant nozzles 17. The air nozzles 31 serve to remove dust and debris from the moving chain before the lubricant is supplied whereas compressed air nozzles 32 forces the lubricant into the chain interfaces and removes any excess lubricant that may be present.

Figure 2:
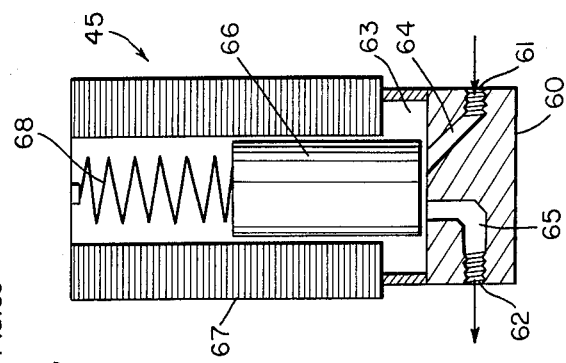
FIG. 2 is an enlarged, cross-sectional view of a solenoid lubricant valve that may be used in the practice of the present invention.

In the practice of the present invention the lubricating system is provided with a source of power or voltage, illustrated in FIG. 1 as power lines 33, electrical relays 34 and 35 and timing devices 36 and 37. In this regard, and again as shown in FIG. 1, ferromagnetic means, such as steel bars or plates 38, are secured or mounted by conventional means, i.e., small bolts or screws, to alternate gear teeths 15. As will be apparent to those skilled in the art, other means, i.e., steel studs or bolts could be used in lieu of the plates 38. The concept here is that such means are mounted or secured to the gear teeth 15. A proximity switch 39, activated by way of a magnetic sensor 40, is positioned immediately below, or in close proximate contact with, the steel bars 38 so that as the sprocket or gear rotates, the steel bars 38, which as previously indicated are placed on every other gear tooth 15, pass by the magnetic sensor 40 of the proximity switch. In operation, the proximity switch 39 closes momentarily to energize the four (4) fast-acting solenoid lubricant valves, indicated at 45 in FIG. 2, to supply the proper amount of lubricant to the corresponding lubricant nozzles 17. As illustrated in FIG. 1, each of the solenoid lubricant valves 45 are mounted within a junction box 46, with each valve being connected to each lubricant nozzle 17 by way of separate flexible conduits 47. As to be discussed below, by adjustment of the proximity switch 39 and the air pressure by way of the air regulator 24, the proper amount of the lubricant is applied by the lubricant nozzles 31 to the interfaces at both ends of the chain. After the lubricant is applied to the chain, compressed air from air nozzles 32 forces the lubricant into the chain interfaces and removes any excess lubricant that may be present.

As previously noted, in the apparatus embodiment illustrated in the drawings, power is supplied from the central control panel of the parcel sorting machine and is electrically connected such that when the sorting apparatus is on, power is supplied to the lubrication system. Correspondingly, when the sorting machine is off, the lubrication system is off. In an emergency, the lubrication system may be turned off by opening the circuit breaker 49.

A timing or running hours indicator 36, mounted to framing or support members indicated generally at 50, serves to monitor and register the total running time of the parcel sorting apparatus. This timing device (36) monitors only the total running time of the sorting and conveying apparatus and does not control nor is it electrically interconnected with the lubricator itself.

In this regard, in a preferred embodiment of the invention, the lubricating system is provided with a control timing mechanism, indicated at 37, which includes two separate timing devices 52 and 53, respectively. Timer 52 monitors and is preset to control the operating time between lubrication periods and serves to activate timing mechanism 53, the latter serving to control the length of the lubrication period itself. In more detail, in operation after the operating time between lubrication periods has elapsed (which is preset as per timer 52) the timer 52 turns on the timing mechanism 53 which activates the power relay 35 and runs for the preset lubrication period. The power relay 35 activates or turns on the following: a solenoid air exhaust valve, indicated at 54 which closes the system to the atmosphere; the air input valve 25 which opens the system to the compressed air supply (through conduit 21); and the solenoid lubricant valves 45 (mounted within the junction box 46) which are in series with the proximity switch 39. It may be noted here, and with reference to FIG. 2, that in a preferred embodiment of the invention, the solenoid lubricating valves 45 comprise fast acting, high speed valves which have a minimum of moving parts and which are adapted to dispense a small given quantity of lubricant on demand and in response to the signal initiated by the proximity switch 39. In this regard, the valves include a valve body indicated at 60 having lubricant inlet and outlet ports 61 and 62, respectively, each port including or formed with internal threading for connection with the lubricant lines and also including check valves (not shown) so that the flow of the lubricant is only in the direction of the arrows shown in FIG. 2. The lubricant inlet 61 and lubricant outlet 62 communicate with the inner valve chamber 63 by way of small ports or passageways 64 and 65, respectively. A valve plunger 66 is mounted for vertical reciprocal movement within the valve chamber 65. In the embodiment shown in FIG. 2, the valve is maintained in a normally closed position, i.e., the plunger 66 is in its lowermost position closing passageways 64 and 65 off from the chamber 63. In operation the signal from the proximity switch 39, which, as indicated above, is electrically interconnected to the solenoid valves by way of power relays 35 and suitable wiring which pass through and are mounted within wiring conduits and electric junction boxes indicated at 70 and 71, respectively, causes the solenoid valves to open which by way of solenoid 67 and spring 68 involves the very fast movement of the plunger upwardly and then downwardly to force the lubricant in the outlet passageway 66 out through the outlet port 62. As will be seen, the valve 45 includes a minimum of parts and is self-lubricating since lubricant is always present within the valve chamber 63. Also, by adjustment of the stroke of the plunger, a small very controlled quantity of lubricant may be quickly dispersed, thus avoiding over lubrication and permitting accurate lubrication on high speed sorting or conveying apparatus. Such solenoid valves are known being sold, for example, by Anger Scientific Corporation of Cedar Knolls, N.J., a division of the Brunswick Corporation.

As discussed above, the timer 52 monitors the operating time between lubrication periods and turns on the timer mechanism 53 which is set to run for the predetermined lubrication period and which, in turn, actuates power relay 35 to open the lubrication solenoid valves 45 in response to signals from the proximity switch 39. In the absence of further control the solenoid valve would remain open for the time interval equal to that period of time involved for the lower surface (38') of the steel bar or plate 38 to pass by, or to remain in proximate contact with, the surface of the magnetic sensor 40. In this regard, in the development of the invention, it was discovered that particularly advantageous results, from the standpoint of the precise control of the amount of lubricant dispersed through the solenoid valves, could be obtained by the use of an electromechanical timer, indicated at 72 in FIG. 1, which converts the signal from the proximity switch into a predetermined or preset time signal or impulse so that the lubricating valve remains open for this preset time and independently of the time period involved for the steel bar to traverse the magnetic sensor 40. The unique advantages of this control are obvious both from the control of the amount of lubricant dispersed onto the moving chain and also from the ability of adapting the lubricating apparatus of the invention for high speed conveying or sorting systems.

As clearly shown in FIG. 1, in the practice of the invention, means are provided for maintaining or filling the lubricant supply source or vessel 20 with lubricant. This comprises an oil fill cap 73 and pipe inlet 74, the latter also being in operative communication with a solenoid valve 76 which by way of the electrical relay 34 remains in a closed position so long as the power source to the lubricating device is in an "ON" position. Safety means, such as a warning light 75, are also provided as a ready "off-on" indication or signal for the operator.

While various embodiments have been disclosed above, as should be readily apparent to those skilled in the art, modifications may be made without departing from the scope of the invention. For example, the electrical circuitry, including, e.g., power relays, timing devices, etc., employ known electrical components. Thus, the particular electrical components used may vary and may comprise electromechanical devices, electronic systems or the like so long as such means meet the required industrial safety standards or codes. The precise sensing means or detectors employed may also be varied if such means are otherwise employed within the overall combination of the present invention as described hereinabove.

What is claimed is:

1. An apparatus for lubricating a chain having links of a fixed length arranged in spaced apart rows and cross pins connecting the links and including rollers positioned between the rows and adapted to ride within a chain sprocket or gear, said apparatus comprising a source of lubricant;
lubricant transfer means connected to said source of lubricant for delivering a given quantity of lubricant to the chain upon receipt of a signal;
    said lubricant transfer means comprising a plurality of nozzles positioned adjacent to said chain and directed toward the links thereof;
    said lubricant transfer means further including high-speed solenoid operated valve mechanisms in operative association with each of said lubricant nozzles; and
ferromagnetic means positioned at fixed points along the chain sprocket or gear on which said chain is cause to rotate;
electromagnetic sensing means for generating a signal in response to proximate contact with said ferromagnetic means caused by rotation of said sprocket and chain;
    said signal causing said solenoid valves to open and deliver a minute, predetermined quanity of lubricant through each of said lubricant nozzles and onto said chain at precise points thereof as defined by the preset position of said ferromagnetic means relative to said chain;
a timing device in operative electrical association with said electromagnetic sensing means and adapted to control the time cycle of the signal produced by said sensing means whereby said solenoid valves remain open for a period of time equal to said time cycle; and
a pair of air nozzles positioned on opposite sides of said lubricant nozzles and adapted to remove dust and debris from the moving chain forward of said lubricant nozzles and to force the lubricant into the chain interfaces and to remove any excess lubricant dispersed from said lubricant nozzles.

* * * * *